United States Patent [19]
Lefebvre et al.

[11] Patent Number: 5,732,745
[45] Date of Patent: Mar. 31, 1998

[54] THERMOPLASTIC TUBE

[75] Inventors: Julien Lefebvre, La Gardeur; Mark Frohlich, Dollard des Ormeaux, both of Canada

[73] Assignee: Marko I.R.D.C., Inc., St. Leonard, Canada

[21] Appl. No.: 611,417

[22] Filed: Mar. 5, 1996

Related U.S. Application Data

[63] Continuation of Ser. No. 189,486, Jan. 31, 1994, abandoned.
[51] Int. Cl.$^6$ .................................................. F16L 11/00
[52] U.S. Cl. ............... 138/118; 138/118.1; 138/141; 138/DIG. 7; 138/DIG. 8; 428/34.3; 428/36.9; 428/36.91
[58] Field of Search ................... 138/118, 118.1, 138/141, DIG. 7, DIG. 8; 428/34.3, 36.9, 36.91

[56] References Cited

U.S. PATENT DOCUMENTS

| | | | |
|---|---|---|---|
| 590,058 | 1/1897 | Symonds. | |
| 3,108,981 | 10/1963 | Clark et al. | 260/32.6 |
| 3,439,865 | 4/1969 | Port et al. | 99/171 |
| 3,470,122 | 9/1969 | Ridgeway et al. | 260/23 |
| 3,562,291 | 2/1971 | Lutzmann et al. | 260/32.6 |
| 3,582,384 | 6/1971 | Beide et al. | 106/308 |
| 3,595,827 | 7/1971 | Foster | 260/32.6 |
| 3,639,333 | 2/1972 | Baitinger | 260/41 B |
| 3,645,822 | 2/1972 | Widiger | 156/243 |
| 3,683,020 | 8/1972 | Luethi et al. | 260/558 R |
| 3,891,587 | 6/1975 | Watts | 260/28.5 AV |
| 4,291,082 | 9/1981 | Stall | 428/138 |
| 4,424,051 | 1/1984 | Lee et al. | 493/37 |
| 4,436,788 | 3/1984 | Cooper | 428/483 |
| 4,594,836 | 6/1986 | Good | 53/459 |
| 4,675,122 | 6/1987 | Liiers et al. | 252/28 |
| 4,680,330 | 7/1987 | Berrier et al. | 524/230 |
| 4,686,817 | 8/1987 | Brodrecht et al. | 53/567 |
| 4,751,262 | 6/1988 | McKinney et al. | 524/231 |
| 4,888,937 | 12/1989 | Glenn | 53/567 |
| 5,066,526 | 11/1991 | German, Jr. | 428/35.2 |
| 5,098,754 | 3/1992 | Horstmyer | 428/35.2 |
| 5,273,809 | 12/1993 | Simmons | 428/212 |

FOREIGN PATENT DOCUMENTS

| | | |
|---|---|---|
| 2345006 | 9/1973 | Germany. |
| 2-258852 | 10/1990 | Japan. |

*Primary Examiner*—Paul R. Michl
*Assistant Examiner*—U. K. Rajguru
*Attorney, Agent, or Firm*—Mathews, Collins, Shepherd & Gould

[57] ABSTRACT

A thermoplastic tube for in-field storage or packaging of bales of agricultural products is disclosed. The tube combines high puncture resistance with an exceptional stretchability, elasticity and good slip properties. The circumference of the tube can be expanded by at least 15% without tearing when stretched in the transverse direction. The tube also shows no substantial permanent deformation 2 hours after being so stretched for a period of time not exceeding 30 minutes and released. Before feeding a bale, the tube is stretched radially to facilitate the insertion and accommodate bales larger than original diameter of the tube. When regaining the original size, the tube wraps up tightly the bales reducing the amount of air trapped in the tube. Since the tube can be enlarged to a variable extent, it may accommodate bales of different shapes and sizes.

16 Claims, 2 Drawing Sheets

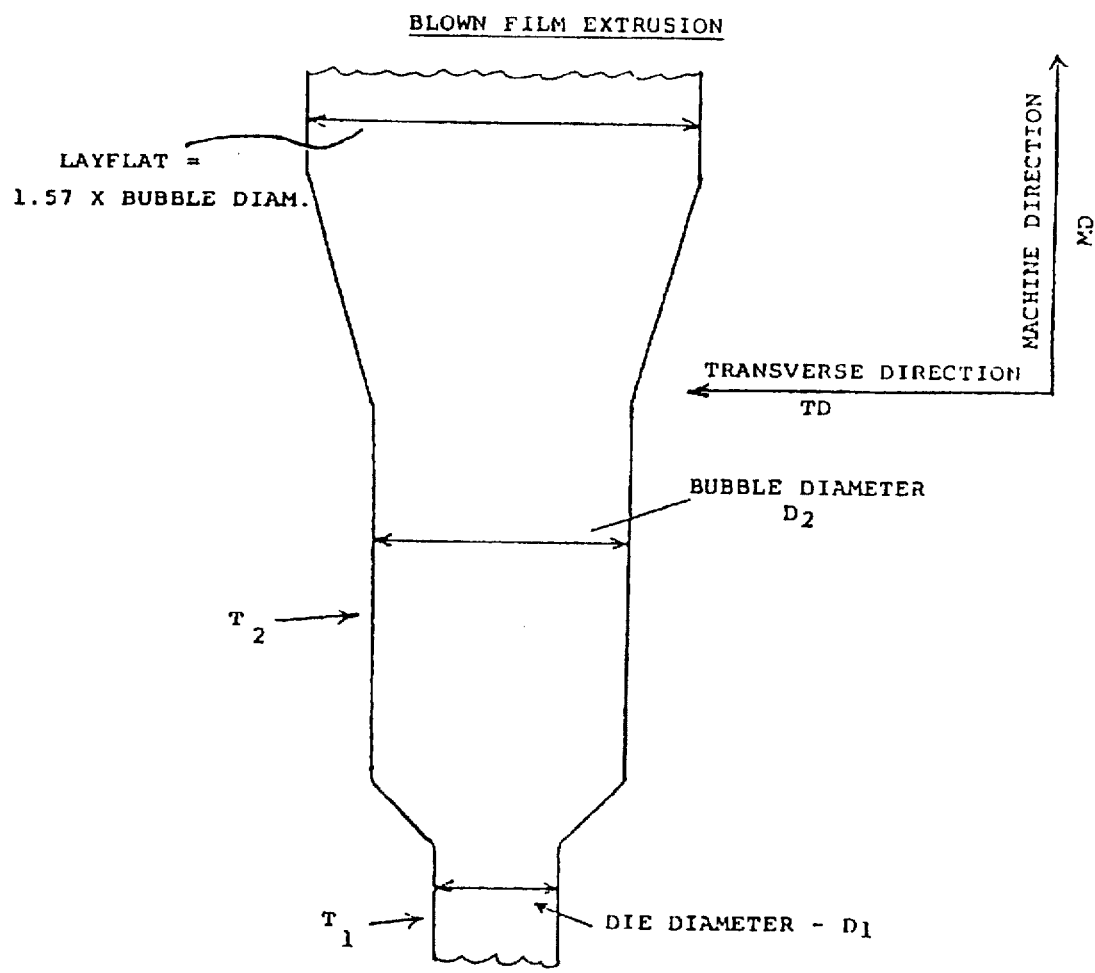

THERMOPLASTIC TUBE

This application is a continuation of application Ser. No. 08/189,486, filed Jan. 31, 1994, now abandoned.

BACKGROUND OF THE INVENTION

This invention relates to a plastic tube for agricultural applications. More particularly, the invention relates to a thermoplastic tube for in-field storage or packaging of bales of agricultural products.

Various agricultural products have been traditionally stored in covered structures, such as barns, sheds and silos. Such structures are weatherproof and provide secure storage for products stored therein. However, using permanent storage facilities involves an additional handling and transporting of the products, which is both time-consuming and expensive. Moreover, permanent storage facilities are not generally sealed of airtight, which may contribute to spoilage and losses in nutritional value of the stored products.

To eliminate the need for permanent storage facilities and to avoid the expenses and disadvantages associated therewith, temporary structures have been developed for storing agricultural products in the field until they are ready for use. Generally, the products left in the field are protected from rain and snow with a moisture impervious covering, usually made of a plastic sheet material.

Many agricultural products, such as hay, peat, corn and the like are formed into bales of various shapes and sizes prior to storage. For in-field storage these bales are placed into long plastic tubes, up to 150 feet or more in length. Various loader devices, for example those disclosed in U.S. Pat. No. 4,594,836, U.S. Pat. No. 4,686,817 or U.S. Pat. No. 4,888,937, may be used for filling the tubes with bales. After being filled with bales, the plastic storage tubes can be tightly closed, to completely protect the bales from weather and to reduce oxidation, thus preserving the nutritional value of the agricultural product.

The most commonly used type of storage tube is manufactured from thermoplastic resin compositions by blown-film extrusion process. The resins used for this purpose are, for example, low pressure linear low density polyethylene and high pressure low density polyethylene. U.S. Pat. No. 4,424,051 discloses a method and apparatus for manufacturing a two-ply agricultural bag for in-field storage of agricultural products.

The use of plastic tubes for in-field storage of bales of agricultural products is not entirely free of problems. Firstly, the tubes must have sufficient interior diameter to accommodate bales fed into the tube. As a result, tubes of different diameters are required to accommodate bales of different shapes and sizes. An attempt to enlarge the tube by stretching it radially prior to feeding the bale, to accommodate bales larger than the tube diameter, usually results in tearing or in a permanent deformation of the tube. Tearing the tube reduces considerably its protective capacity whereas the permanent deformation results in retaining more air in the tube, which contributes to spoilage of the stored product. Tubes which are loose are also subject to wind damages caused by fatigue failures. Even if the tearing can be avoided, an attempt to stretch the tube results in weakening of the plastic film, thus decreasing its puncture resistance and increasing the danger of introducing unwanted holes through which moisture and other contaminants can enter.

SUMMARY OF THE INVENTION

It is therefore an object of this invention to provide a plastic tube for in-field storage of bales of agricultural products, which tube combines high puncture resistance with an exceptional stretchability, elasticity and good slip properties.

It is another object of the invention to provide a resin composition for producing a plastic film which combines high puncture resistance with an exceptional stretchability, elasticity and good slip properties.

It is still another object of the invention to provide a method for producing a plastic tube for in-field storage of bales of agricultural products, which tube combines high puncture resistance with an exceptional stretchability, elasticity and good slip properties.

Thus, according to one aspect, the invention provides a resin composition for the manufacture of a thermoplastic tube for in-field storage of bales of an agricultural product, said composition comprising from 55 to 90% by weight of an ethylene-vinyl acetate copolymer, from 5 to 35% by weight of a linear low density polyethylene, from 3 to 8% by weight of a pigment masterbatch, from 1.5 to 4% by weight of a UV stabilizer masterbatch and from 1 to 5% by weight of a slip agent masterbatch.

According to another aspect, the invention provides a thermoplastic tube for in-field storage of bales of an agricultural product, said tube being capable of having circumference expanded by at least 15% without tearing when stretched in the transverse direction and showing no substantial permanent deformation 2 hours after being stretched for a period of time not exceeding 30 minutes and released.

According to a further aspect, the invention provides a process for manufacturing a thermoplastic tube for in-field storage of bales of an agricultural product, said tube capable of having circumference expanded by at least 15% without tearing when stretched in the transversal direction and showing no substantial permanent deformation 2 hours after being stretched for a period of time not exceeing 30 minutes and released, said process comprising extruding a thermoplastic composition by a continuous blown-film extrusion process.

The plastic tube according to the invention is characterized by a unique combination of features. Most importantly, the tube can be stretched radially in its transverse direction (TD) and its size increased on the average of up to 35% (and locally up to 75%), as measured along its circumference, without tearing or a substantial permanent deformation. Generally, deformations do not exceed 3% of the original size when measured 2 hours after the tension applied to the tube for 30 minutes was released.

This has important practical consequences when the tube is used for storing bales of agricultural products. Before feeding a bale, the tube can be stretched radially and its diameter increased to facilitate the insertion of the bale. Under normal operating conditions, the tube is stretched to accommodate bales larger than the original diameter of the tube. When regaining the original size, the tube wraps the bales up tightly reducing or eliminating the danger of possible wind damages and squeezing out the air from the tube. This reduces the amount of air trapped in the tube and, as a result, oxidation and spoilage of the stored product. This also reduces the spoilage of the product due to air penetration through accidental holes, by limiting circulation of the air along the tube. Also, since the tube can be enlarged to a variable extent prior to feeding a bale, a tube of a given size may accommodate bales of many different shapes and sizes, thus reducing the need for tubes of different sizes adapted to the size of bales.

BRIEF DESCRIPTION OF THE DRAWINGS

FIG. 2 shows schematically the essential parameters of the blown-film extrusion process.

DESCRIPTION OF PREFERRED EMBODIMENTS

Figure 1:
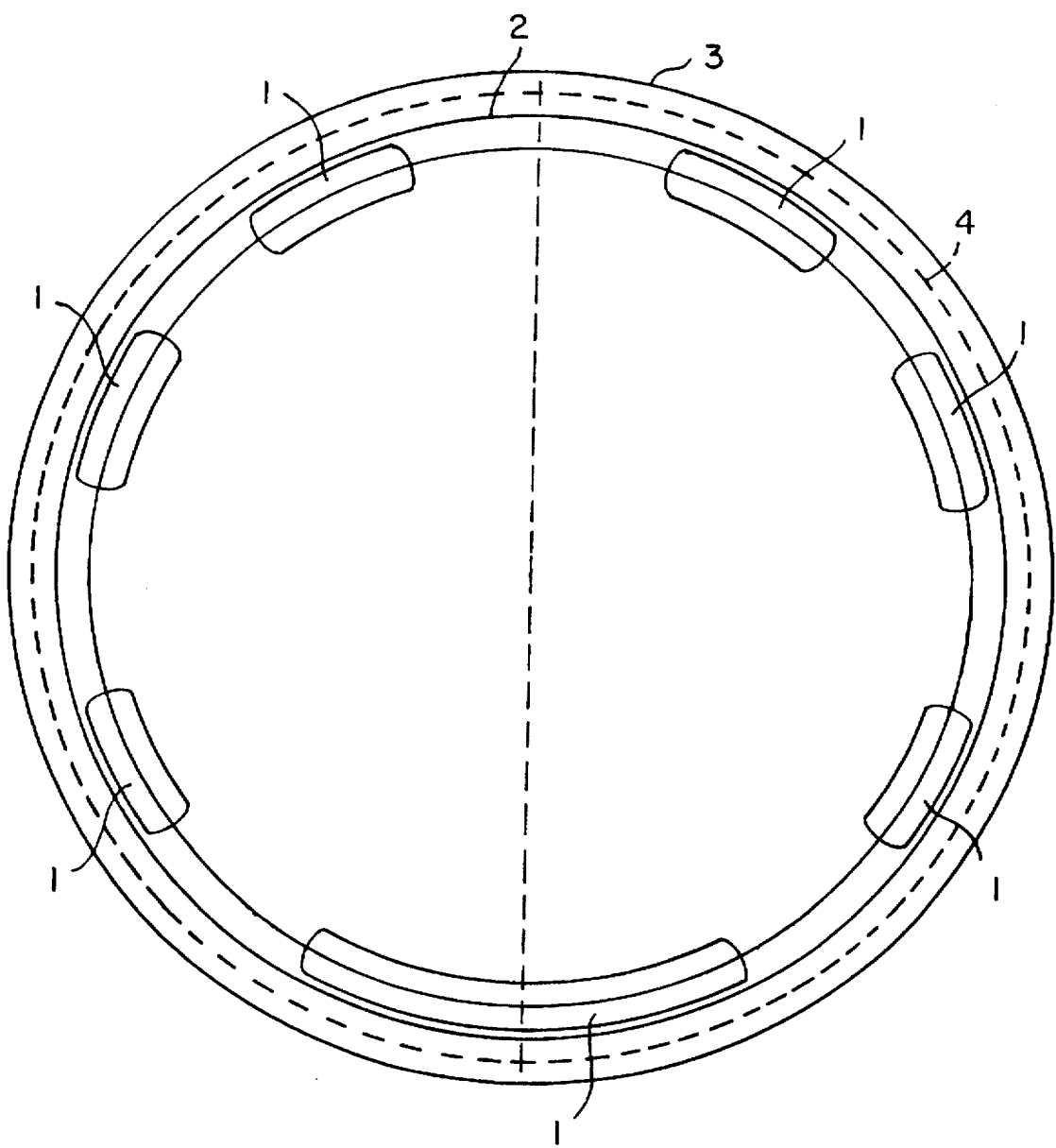
FIG. 1 represents schematically an apparatus for determining the stretch factor of a tube according to the invention.

The composition from which the plastic tube of the invention is manufactured comprises two resin components: an ethylene-vinyl acetate (EVA) copolymer and a linear low density polyethylene (LLDPE). The composition further comprises a pigment, a UV stabilizer and a slip agent. Generally, the composition comprises 55 to 90% of EVA copolymer, 5 to 35% of LLDPE, 3 to 8% of pigment masterbatch, 1.5 to 4% of UV stabilizer masterbatch and 1 to 5% of slip agent masterbatch. A composition comprising 60 to 80% of EVA copolymer, 13 to 23% of LLDPE, 4 to 7% of pigment masterbatch, 1.75 to 3% of UV stabilizer masterbatch and 2 to 4% of slip agent masterbatch is preferred. A composition comprising 65 to 75% of EVA copolymer, 15 to 20% of LLDPE, 4.5 to 6.5% of pigment masterbatch, 1.75 to 2.5% of UV stabilizer masterbatch and 2 to 3% of slip agent masterbatch is particularly preferred.

A masterbatch is a mixture of a non-resinous agent and a polyethylene base, usually a linear low density polyethylene (LLDPE) and/or low density polyethylene (LDPE). The composition of a given masterbatch may vary depending on the non-resinous component and its required amount in the resin composition. For example, the pigment masterbatch of the invention contains preferably 50% of a pigment and 50% of the polyethylene base, whereas the UV stabilizer masterbatch contains preferably 10% of a UV stabilizer and 90% of the polyethylene base. The slip agent masterbatch contains preferably 4.5% of a slip agent, 10% of an anti-blocking agent and 85.5% of the polyethylene base. The composition of a masterbatch is not critical and the ratio of the non-resinous agent to the polyethylene base may be appropriately adjusted, depending on the required properties of the film, such as light transmission, UV stability or slip and anti-blocking properties. A person skilled in the art would be able to make necessary adjustments and even if experimentation were required this would be of a routine nature and would not involve exercise of any inventive faculty.

The vinyl acetate content of the EVA copolymer should be in the range of from 1.5 to 8%, preferably from 2 to 6%, most preferably from 3 to 5%. Density of the EVA copolymer should remain between 0.920 and 0.930 g/cm$^3$, preferably between 0.922 to 0.928 g/cm$^3$, more preferably 0.924 to 0.928 g/cm$^3$. Melt index of the EVA copolymer should be between 0.20 and 2.0 dg/min, preferably between 0.25 to 1.0 dg/min, more preferably 0.25 to 0.8 dg/min.

Many commercially available EVA copolymers meet the above requirements, for example NA-985, NA-480, NA-441, NA 362, NA-340, NA-316, NA-314 and NA-304 (products of QUANTUM Chemical Corporation). Of these, NA-480 is preferred. Examples of other suitable EVA copolymers are 1005 VN2, 1005 VG2, 1020 VB2, 1020 VG2 and 1005 VN3 (products of ELF-ATO CHEM), 633C, 640A, 1025, 1041C, 1047, 1060 (products of A.T. PLASTICS), EHA-152 and EHA-019 (products of MOBIL).

Linear low density polyethylene component should have density from 0.916 to 0.925 g/cm$^3$, preferably from 0.918 to 0.923 g/cm$^3$, more preferably 0.918 to 0.921 g/cm$^3$ and melt index from 0.50 to 1.6 dg/min, preferably from 0.5 to 1.2 dg/min more preferably 0.6 to 1.1 dg/min. Examples of suitable LLDPE resins are DOWLEX-2021, DOWLEX-2045, DOWLEX-2070, DOWLEX-2073 and DOWLEX-2101(products of Dow Chemical Canada Inc.). Of these, DOWLEX-2021 is preferred. Further examples are L-2007-F, L-2001-F and L-2002-F (products of EASTMAN KODAK).

A pigment is added to the resin composition of the invention to reduce the light transmission of the film. Reducing the amount of light penetrating into the tube reduces the spoilage of the product stored therein, by eliminating or limiting photochemical processes initiated by the light. Making the tube opaque also provides a protection against birds, which frequently puncture transparent tubes when attracted by their content. Pigment of any colour can be used, if compatible with the resin composition, in the amount necessary to reduce the light transmission of the film to below 45%. Light transmission in the range of from 25 to 35% is preferred. Reducing the light transmission even further increases the cost of the product without increasing substantially the light protective capacity of the film.

Examples of suitable pigments include titanium dioxide, carbon black, iron oxide, ultramarine blue, phthalocyanine green and quinacridone red. Of these, titanium dioxide is preferred. In a monolayer film, using a white pigment increases the reflectivity of the film and reduces the light transmission. In a co-extruded two-ply film, the white pigment is preferred for the external layer, to reflect light and reduce heat build-up. A dark, light-absorbing pigment, such as carbon black, is preferred for the internal layer, to prevent light transmission.

When filled with bales of an agricultural product and left in the field, the plastic tube becomes heavily exposed to UV radiation, which causes photochemical degradation and accelerated oxidation of the plastic material. As a result, the tube loses its strength and elasticity and becomes prone to accidental tearing and puncturing. To protect the tube from the degradating effect of UV radiation, a UV stabilizer is added to the resin composition, in an amount necessary to protect the mechanical properties of the tube for at least one year. The amount of stabilizer necessary for this purpose depends on the stabilizer used. Both the choice of a suitable stabilizer and the necessary amount would be apparent to those skilled in the art. Examples of UV stabilizers which may be added to the resin composition according to the invention are CHIMASSORB 944, CHIMASSORB 81, TINUVIN 770, TINUVIN 315, TINUVIN 326, TINUVIN 327, TINUVIN 144, TINUVIN 622, and TINUVIN 765 (products of Ciba-Geigy). Of these, CHIMASSORB 944 is preferred.

The plastic tube according to the invention is further characterized by good slip and anti-blocking properties. Good slip properties, i.e., the ability of the film to slide smoothly and quickly over other surfaces, facilitate the insertion of bales into the tube and reduce the risk of an accidental tearing by stalks, snags and the like extending from the bales. These properties are achieved by incorporating into the resin composition slip agents compatible therewith, for example fatty acid amides. Of these, oleamide, stearamide, erucamide and mixtures thereof are preferred.

Blocking, understood as the tendency of the film to cling to itself, should also be avoided, to ensure smooth operation of the loader device used for filling the tube. Anti-blocking properties can be achieved by incorporating into the resin composition suitable anti-blocking agents, for example inorganic silica materials. Of these, diatomaceous earth is preferred.

The tube according to the invention can be manufactured by a continuous blown-film extrusion process, using equipment known to those skilled in the art. FIG. 2 shows schematically the essential parameters of the used equipment and the extruded bubble. The extruder is operated at a blow-up ratio of from 1.5 to 5.0. A blow-up ratio of from 2.0 to 4.5 is preferred. A blow-up ratio of from 2.5 to 4.0 is particularly preferred. The process is carried out at a drawdown ratio of from 10 to 30. A drawdown ratio of from 14 to 25 is preferred. A drawdown ratio of from 16 to 22 is particularly preferred.

The thickness of the unstretched film remains in the range of from 3.6 to 4.4 mils, preferably from 3.8 to 4.2 mils. A thickness of 4.0 mils is particularly preferred.

In one embodiment, after being laid flat, the tube is wound on to a windup roll for storage. Storage tubes for use with a loader device are prepared by unwinding the tube from the roll and cutting off sections of the required length, for example 150 feet long.

The tube according to the invention may consist of several layers of plastic material. Such a multi-ply tube is manufactured by a continuous blown-film co-extrusion process known to those skilled in the art. In the process of co-extrusion a good adherence of the layers of the film is achieved. The extruder is operated at blow-up and drawdown ratios similar to those used in the case of the monolayer tube. A two-ply tube, having a white external layer and a black internal layer is preferred. Titanium dioxide and carbon black, respectively, are preferred as pigments for the external and the internal layer.

The two layers of the two-ply tube may be extruded using the same or different resin compositions and may have the same or different thickness. A total thickness of 4 mils is preferred. Both layers are normally characterized by similar levels of UV protection and slip properties. Preferred levels of light transmission for the two-ply tube are the same as for the monolayer tube but may be significantly lower when one of the layer is black.

EXAMPLE 1

A composition comprising 71.75% of NA-480 ethylene vinyl acetate copolymer, 17.94% of DOWLEX 2021 linear low density polyethylene, 5.38% of pigment masterbatch (50% of titanium dioxide and 50% of polyethylene base), 1.79% of UV stabilizer masterbatch (10% of CHIMASSORB 944 and 90% of polyethylene base) an 3.14% of slip agent masterbatch (4.5% of erucamide, 10% of diatomaceous earth and 85.5% of polyethylene base) was extruded at a blow-up ratio of 2.95 and at a drawdown ratio of 21.5. The properties of the tube are shown in Table 1.

TABLE 1

| PROPERTY | UNIT | METHOD | TYPICAL VALUE[a] | RANGE[b] |
|---|---|---|---|---|
| Layflat | inch | — | 73.5 | — |
| Thickness | mil | ASTM-D-2103 | 4.0 | 3.6–4.4 |
| Coefficient of friction | — | ASTM-D-1894 | 0.12 in/in | 0.10–0.30 |
| | | | 0.12 out/out | 0.10–0.30 |
| Dart drop impact, F50 | g/mil | ASTM-D-1709 | 150 (600 g) | >100 |
| Tensile strength | psi | ASTM-D-882 | 3700 (MD) | <4200 |
| | | | 3900 (TD) | <4200 |
| Elongation | % | ASTM-D-882 | 860 (MD) | >500 |
| | | | 1070 (TD) | >500 |
| Tear | g/mil | ASTM-D-1922 | 118 (MD) | >90 |

TABLE 1-continued

| PROPERTY | UNIT | METHOD | TYPICAL VALUE[a] | RANGE[b] |
|---|---|---|---|---|
| strength | | | 197 (TD) | >170 |
| Light transmission | % | ASTM-D-1003 | 35 | <45 |
| Stretch factor | % | BALCAN | 32 (TD) | 15–75 |

[a] average of at least 5 measurements
[b] range of acceptable values
MD - machine direction
TD - transverse direction

DETERMINATION OF STRETCHABILITY

The stretchability of the tube was determined using an adjustable bale bagger shown schematically in FIG. 1, according to the following procedure. 1. Fold a 150 feet, 4 mils tube into 18 inches folds. 2. Mark a line every 6 or 12 inches on the outside fold (3) or inside fold (2) ofthe tube. Add distances between the marks to calculate the original circumference ($C_o$) of the tube. 3. Place the folded tube (4) on the arms (1) of the bagger. 4. Stretch the tube in its transverse direction (radially) to maximum of the bagger's capacity or until tearing in the machine direction becomes evident. 5. Leave the tube stretched for 30 minutes and measure distances between the marks. Add distances between the marks to calculate circumference of the stretched tube ($C_s$). 6. Release tension, allow the tube to relax for 2 hours and repeat the measurement. Add distances between the marks to calculate the final circumference ($C_f$) of the tube. 7. Calculate the stretch factor SF as:

$$SF = \frac{C_s - C_o}{C_o} \times 100\%$$

8. Calculate the permanent deformation PD as:

$$PD = \frac{C_f - C_o}{C_o} \times 100\%$$

We claim:

1. A seamless thermoplastic tube being formed by subjecting a resin composition to a continuous blow-film extrusion process, said extrusion process being carried out with a blow-up ratio greater than 2.5 and draw down ratio of from 10 to 30, said resin composition comprising:

a) from 55 to 90% by weight of an ethylene-vinyl acetate copolymer;

b) from 5 to 35% by weight of a linear low-density polyethylene;

c) from 3 to 8% by weight of a pigment masterbatch comprising a pigment and a polyethylene base;

d) from 1.5 to 4% by weight of a UV stabilizer masterbatch comprising a UV stabilizer and a polyethylene base; and e) from 1 to 5% by weight of a slip agent masterbatch comprising a slip agent, an antiblocking agent and a polyethylene base;

wherein during use the circumference of said tube can be expanded by at least 15% without tearing when stretched in the radial direction and shows no substantial permanent deformation 2 hours after being stretched for a period of time not exceeding 30 minutes and released.

2. The tube of claim 1 wherein said resin composition comprises:

a) from 60 to 80% by weight of said ethylene-vinyl acetate copolymer;
b) from 13 to 23% by weight of said linear low-density polyethylene;
c) from 4 to 7% by weight of said pigment masterbatch;
d) from 1.75 to 3% by weight of said UV stabilizer masterbatch; and
e) from 2 to 4% by weight of said slip agent masterbatch.

3. The tube of claim 1 wherein said resin composition comprises:
a) from 65 to 75% by weight of said ethylene-vinyl acetate copolymer;
b) from 15 to 20% by weight of said linear low-density polyethylene;
c) from 4.5 to 6.5% by weight of said pigment masterbatch;
d) from 1.75 to 2.5% by weight of said UV stabilizer masterbatch; and
d) from 2 to 3% by weight of said slip agent masterbatch.

4. The tube of claim 1, wherein:
i) said pigment masterbatch comprises 50% of said pigment and 50% of said polyethylene base;
ii) said UV stabilizer masterbatch comprises 10% of said UV stabilizer and 90% of said polyethylene base; and
iii) said slip agent masterbatch comprises 4.5% of said slip agent, 10% of said antiblocking agent and 85.5% of said polyethylene base.

5. The tube of claim 1, wherein said ethylene-vinyl acetate copolymer has a vinyl acetate content of from 1.5% to 8% by weight.

6. The tube of claim 1, wherein said ethylene-vinyl acetate copolymer has a melt index of from 0.20 to 2.0 dg/min.

7. The tube of claim 1, wherein said linear low density polyethylene has a density of from 0.916 to 0.925 g/cm$^3$.

8. The tube of claim 1, wherein said linear low density polyethylene has a melt index of from 0.5 to 1.6 dg/min.

9. The tube of claim 1, wherein said tube is a monolayer tube.

10. The tube of claim 1, wherein said tube has a light transmission below 45%.

11. The tube of claim 1, wherein said pigment is titanium dioxide.

12. The tube of claim 1, wherein said tube is a multi-ply tube.

13. The tube of claim 1, wherein said tube is a two-ply tube comprising an external layer and an internal layer.

14. The tube of claim 13, wherein said external layer comprises a white pigment and said internal layer comprises a black pigment.

15. The tube of claim 1, wherein said draw down ratio is of from 16 to 22.

16. A seamless thermoplastic tube being formed by subjecting a resin composition to a continuous blow-film extrusion process, said extrusion process being carried out with a blow-up ratio of from 2.4 to 4.0 and a draw down ratio of from 10 to 30, said resin composition comprising:
a) from 55 to 95% by weight of an ethylene-vinyl acetate copolymer having a melt index of from 0.20 to 2.0 dg/min;
b) from 5 to 35% by weight of a linear low-density polyethylene having a melt index of from 0.5 to 1.6 dg/min;
c) frown 3 to 8% by weight of a pigment masterbatch comprising 50% of a pigment and 50% of a polyethylene base;
d) from 1.5 to 4% by weight of a UV stabilizer masterbatch comprising 10% of a UV stabilizer and 90% of a polyethylene base; and
e) from 1 to 5% by weight of slip agent masterbatch comprising 4.5% of a slip agent selected from the group consisting of oleamide, stearmide, erucamide and mixtures thereof, 10% diatomaceous earth and 85.5% of a polyethylene base;

said tube having a light transmission below 45% and wherein during use, the circumference of said tube can be expanded by at least 15% without tearing when stretched in the radial direction and shows no substantial permanent deformation 2 hours after being stretched for a period of time not exceeding 30 minutes and released.

* * * * *